United States Patent [19]

Embach

[11] Patent Number: 4,885,565
[45] Date of Patent: Dec. 5, 1989

[54] TOUCHSCREEN CRT WITH TACTILE FEEDBACK

[75] Inventor: James T. Embach, Rochester Hills, Mich.

[73] Assignee: General Motors Corporation, Detroit, Mich.

[21] Appl. No.: 200,888

[22] Filed: Jun. 1, 1988

[51] Int. Cl.$^4$ .............................................. G08B 1/00
[52] U.S. Cl. .................................................. 340/407
[58] Field of Search ................ 340/407, 712; 341/27; 364/709.06

[56] References Cited

U.S. PATENT DOCUMENTS

| | | |
|---|---|---|
| 3,482,241 | 12/1969 | Johnson . |
| 3,919,691 | 11/1975 | Noll . |
| 4,028,502 | 6/1977 | Moricca et al. . |
| 4,078,257 | 3/1978 | Bagley ............................ 340/407 X |
| 4,334,280 | 6/1982 | McDonald ...................... 340/407 X |
| 4,346,376 | 8/1982 | Mallos . |
| 4,667,182 | 5/1987 | Murphy ............................. 340/407 |

OTHER PUBLICATIONS

IBM Technical Disclosure Bulletin, vol. 24, No. 10, pp. 5271–5272, Mar. 1982.

Primary Examiner—Joseph A. Orsino
Assistant Examiner—Brian R. Tumm
Attorney, Agent, or Firm—Howard N. Conkey

[57] ABSTRACT

Apparatus for providing tactile feedback in response to the touch input command of a user to the touchscreen of a cathode ray tube in a CRT command and display system. An actuator is provided for imparting motion to the CRT when the actuator is energized. Energization occurs in response to a touch input command of the user to the touchscreen of the CRT. When energized, the actuator provides tactile feedback to the user by imparting motion to the CRT.

4 Claims, 1 Drawing Sheet

TOUCHSCREEN CRT WITH TACTILE FEEDBACK

BACKGROUND OF THE INVENTION

This invention relates to an apparatus for providing tactile feedback to a touchscreen cathode ray tube (CRT) display and command system.

CRT command and display systems utilizing a microprocessor in conjunction with a touchscreen CRT are standard in the art. The user is offered a variety of choices which are displayed on the screen. To make a selection the user touches the screen at a given location. Previously, such CRT systems have supplied audio and visual feedback when the user has successfully made a selection. In some environments, such as in automotive applications, audio feedback may be masked by radio or road noise, and visual contact away from the road must be minimized.

SUMMARY OF THE INVENTION

Tactile feedback is one technique that can be used to support audio and visual feedback to solve the problems present in automotive applications. This invention provides a cathode ray tube command and display system with an apparatus for providing tactile acknowledgment of a touch input command of a user to the touchscreen of a CRT. When the user inputs a touch command, a microprocessor, in addition to controlling the audio and visual indicators as in conventional systems, energizes the winding of a solenoid to conduct a mechanical shock pulse through the CRT chassis. This moves the CRT chassis enough to produce a tactile feedback to the user.

The apparatus includes a solenoid actuator for imparting motion to the cathode ray tube when energized in response to the touch input command of the user to the touchscreen. Shock mounting means for mounting the CRT allow limited movement of the CRT when the actuator is energized.

Upon energization of the solenoid winding, an armature moves until it contacts with an elastomer washer thereby imparting motion to the CRT. The elastomeric surface is employed to inhibit noise created by the contact.

BRIEF DESCRIPTION OF THE DRAWINGS

The invention may be best understood by reference to the following description of a preferred embodiment and the drawings in which.

DESCRIPTION OF THE PREFERRED EMBODIMENT

Figure 1:
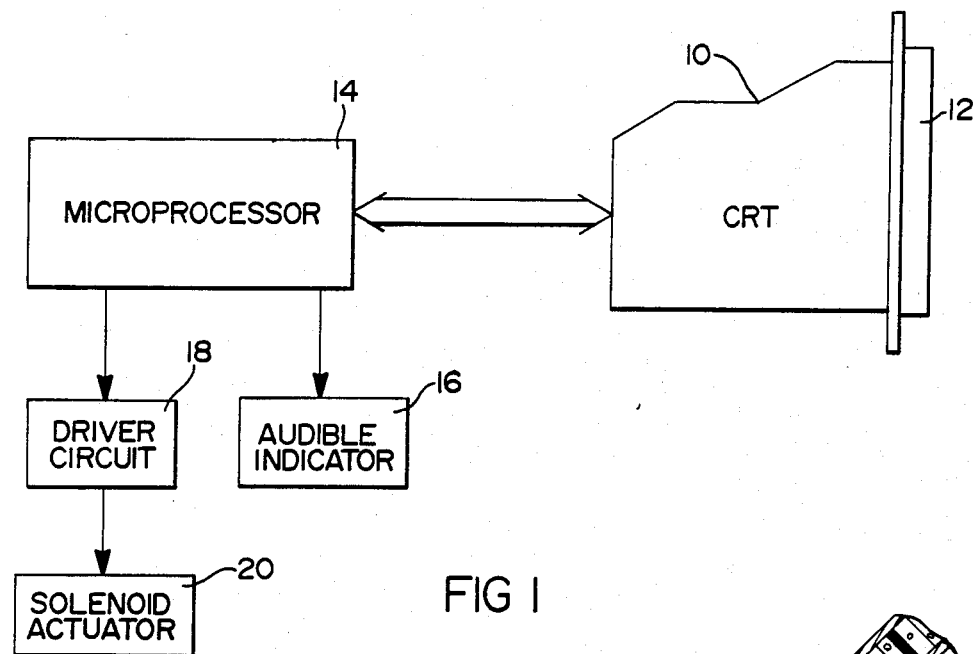
FIG. 1 is a block schematic diagram of a cathode ray tube command and display system for providing tactile feedback in response to a user input command.

An interactive system for enabling a user of a cathode ray tube touchscreen system to physically sense a tactile response to a user touch input command is illustrated schematically in FIG. 1. In its simplest form, the system includes CRT chassis unit 10 which displays a visual feedback on touchscreen 12 of a cathode ray tube in response to a user input command to the face of touchscreen 12. The display of information, including the visual feedback, is controlled by microprocessor 14. Microprocessor 14, interacting with audible indicator 16, also controls the audio response to a touch input command of a user. Microprocessor 14 supplies an input via driver circuit 18 to solenoid actuator 20 mounted on the distal end of chassis unit 10. Solenoid actuator 20, in a manner to be described, causes sufficient movement of the CRT to produce a tactile feedback to the user, acknowledging the user touch input to the touchscreen 12. This motion imparted to the user through the CRT chassis unit 10 alerts the user that a selection has been successfully made. In automotive use where the audio feedback can be masked by radio or road noise, and visual contact off the road must be minimized, tactile feedback capability represents an ergonomic advantage.

Figure 2:
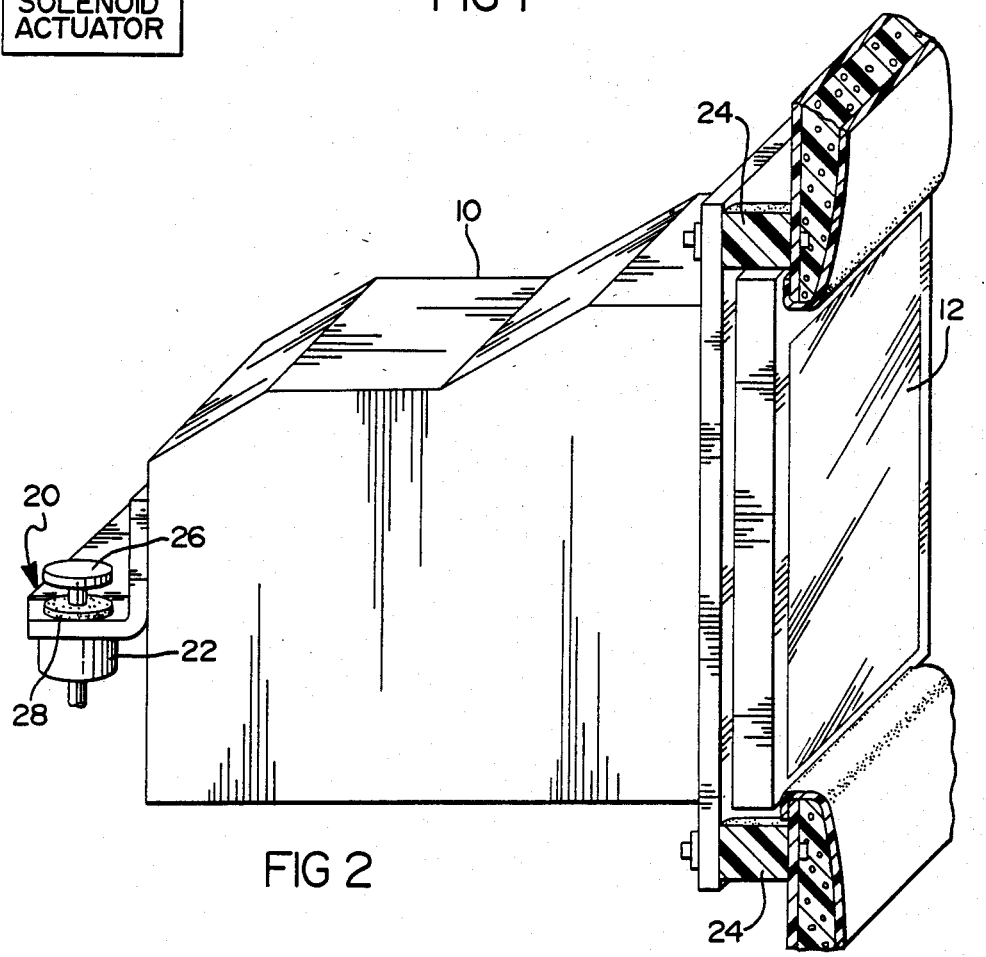
FIG. 2 is a pictorial representation of a cathode ray tube including the claimed improvement.

The solenoid actuator 20, as can be seen in FIG. 2, includes a solenoid winding 22 and an armature 26 terminating in a disc at one end that is biased away from a stop formed by an elastomer washer 28. When the winding 22 is energized, the armature 26 is accelerated toward the elastomer washer 28. When the armature 26 strikes the washer 28, the disc end of the armature 26 and the surface of the washer 28 thereby creating a stop means, a mechanical shock is imparted to the CRT chassis unit 10. The CRT chassis unit 10, rather than being rigidly mounted, is mounted by elastomeric shock mounts 24 which allow limited displacement of the chassis unit 10. Consequently, when the armature 26 strikes the stop means created by the disc end of the armature 26 and the surface of the washer 28, elastomeric shock mounts 24 allow limited displacement when the solenoid actuator 20 jolts the CRT chassis unit 10, at the same time protecting the CRT from normal road vibrations.

The foregoing description of a preferred embodiment for the purpose of explaining the principles of this invention is not to be considered as limiting or restricting the invention since many modifications may be made by the exercise of skill in the art without departing from the scope of the invention.

The embodiments of the invention in which an exclusive property

1. Apparatus for providing acknowledgment of a touch input command of a user to the touchscreen of a cathode ray tube of a CRT command and display system, the apparatus comprising in combination:
   shock mounting means for mounting the cathode ray tube, the mounting means allowing limited movement of the cathode ray tube;
   an actuator means for imparting motion to the cathode ray tube when the actuator means is energized;
   energizing means responsive to a touch input command of the user to the touchscreen of the cathode ray tube for energizing the actuator means, whereby tactile feedback is provided to the user by the motion imparted to the cathode ray tube by the actuator means to acknowledge the touch input command.

2. The apparatus of claim 1 wherein the actuator means comprises a solenoid energized by the energizing means, an armature, armature stop means and means biasing the armature away from the stop means, the solenoid being effective when energized for moving the armature to contact the stop means to impart motion to the cathode ray tube.

3. The apparatus of claim 2 wherein the stop means includes an elastomeric surface that is contacted by the armature for inhibiting noise created by contact.

4. A CRT system comprising:
   a cathode ray tube having a touchscreen;

a CRT chassis for carrying the cathode ray tube, the chassis having an open end through which the touchscreen of the cathode ray tube is exposed;

means for mounting the chassis from the open end;

an actuator mounted to the distal end of the chassis, the actuator including a solenoid, an armature, armature stop means and means biasing the armature away from the stop means, the solenoid being effective when energized for moving the armature to contact the stop means to impart motion to the CRT chassis and the cathode ray tube carried thereby; and means responsive to a touch input command of a user to the touchscreen of the cathode ray tube for energizing the solenoid to cause the armature to be moved to contact the stop means and impart motion to the cathode ray tube, whereby tactile feedback is provided to the user to acknowledge the touch input command.

* * * * *